United States Patent
Liang et al.

(10) Patent No.: US 11,874,466 B2
(45) Date of Patent: Jan. 16, 2024

(54) AUGMENTED REALITY APPARATUS, AND OPTICAL SYSTEM AND SEMI-REFLECTOR THEREFOR

(71) Applicant: Matrixed Reality Technology Co., Ltd., Wuxi (CN)

(72) Inventors: Xiaobin Liang, Beijing (CN); Bing Xiao, Beijing (CN); Chi Xu, Beijing (CN)

(73) Assignee: Matrixed Reality Technology Co., Ltd., Wuxi (CN)

( * ) Notice: Subject to any disclaimer, the term of this patent is extended or adjusted under 35 U.S.C. 154(b) by 715 days.

(21) Appl. No.: 16/989,502

(22) Filed: Aug. 10, 2020

(65) Prior Publication Data

US 2020/0371368 A1    Nov. 26, 2020

Related U.S. Application Data

(63) Continuation-in-part of application No. PCT/CN2019/074857, filed on Feb. 12, 2019.

(30) Foreign Application Priority Data

Feb. 12, 2018 (CN) .......................... 201810146738.7
Feb. 12, 2018 (CN) .......................... 201810146751.2
(Continued)

(51) Int. Cl.
*G02B 26/06*        (2006.01)
*G02B 27/00*        (2006.01)
(Continued)

(52) U.S. Cl.
CPC ....... *G02B 27/0172* (2013.01); *G02B 27/017* (2013.01); *G02B 1/11* (2013.01);
(Continued)

(58) Field of Classification Search
CPC .... G02B 27/0172; G02B 27/017; G02B 1/11; G02B 27/0101; G02B 27/0955;
(Continued)

(56) References Cited

U.S. PATENT DOCUMENTS

| 1,282,425 A | 11/1972 | Freeman |
| 6,215,593 B1 | 4/2001 | Bruce |

(Continued)

FOREIGN PATENT DOCUMENTS

| CN | 1664649 A | 9/2005 |
| CN | 1743891 A | 3/2006 |

(Continued)

OTHER PUBLICATIONS

Zhang, Zhonghua et al., "Principles and techniques of optoelectronics", published in Oct. 2009; p. 352-355.
(Continued)

*Primary Examiner* — Joseph P Martinez
*Assistant Examiner* — Grant A Gagnon
(74) *Attorney, Agent, or Firm* — Kilpatrick Townsend & Stockton LLP

(57) ABSTRACT

The disclosure relates to an augmented apparatus, and an optical system and a semi-reflector for the same. The optical system comprises: an image projection source; a beam splitter, the beam splitter having a beam splitting side adjacent to the image projection source and a transmission side facing away from the image projection source; and a semi-reflector, the semi-reflector being arrange adjacent to the beam splitting side and being downstream of the beam splitting side in an optical path along which light emitted from the image projection source is reflected by the beam splitting side, the beam splitter being arranged such that the light emitted from the image projection source is able to be at least partially reflected by the beam splitting side towards (Continued)

the semi-reflector, wherein the semi-reflector comprises a substrate and a semi-reflective film on a distal surface of the substrate. According the present application's technical means, the design freedom of the whole optical system can be increased and the field of view can be enlarged, which facilitates the final imaging result in the human eye.

19 Claims, 8 Drawing Sheets

(30) Foreign Application Priority Data

| | | |
|---|---|---|
| Feb. 12, 2018 | (CN) | 201810146905.8 |
| Feb. 12, 2018 | (CN) | 201810146912.8 |
| Feb. 12, 2018 | (CN) | 201810146915.1 |
| Feb. 12, 2018 | (CN) | 201810147325.0 |
| Feb. 12, 2018 | (CN) | 201810147326.5 |
| Feb. 12, 2018 | (CN) | 201810147328.4 |
| Feb. 12, 2018 | (CN) | 201810147330.1 |
| Feb. 12, 2018 | (CN) | 201810147332.0 |
| Feb. 12, 2018 | (CN) | 201810147336.9 |

(51) Int. Cl.
*G02B 26/10* (2006.01)
*G02B 27/28* (2006.01)
*G02B 27/42* (2006.01)
*G02B 27/01* (2006.01)
G02B 27/12 (2006.01)
G02B 1/11 (2015.01)
G02B 27/09 (2006.01)
G02B 27/14 (2006.01)

(52) U.S. Cl.
CPC ...... *G02B 27/0101* (2013.01); *G02B 27/0955* (2013.01); *G02B 27/123* (2013.01); *G02B 27/142* (2013.01); *G02B 27/145* (2013.01); *G02B 27/281* (2013.01); *G02B 27/283* (2013.01); *G02B 27/286* (2013.01); *G02B 2027/013* (2013.01); *G02B 2027/0118* (2013.01); *G02B 2027/0178* (2013.01); *G02B 2027/0185* (2013.01)

(58) Field of Classification Search
CPC .. G02B 27/123; G02B 27/142; G02B 27/145; G02B 27/281; G02B 27/283; G02B 27/286; G02B 2027/0118; G02B 2027/013; G02B 2027/0178; G02B 2027/0185
USPC .......................................................... 359/488
See application file for complete search history.

(56) References Cited

U.S. PATENT DOCUMENTS

| | | | |
|---|---|---|---|
| 7,733,572 B1 | 6/2010 | Brown et al. | |
| 8,094,377 B2 | 1/2012 | Kessler et al. | |
| 9,971,150 B1* | 5/2018 | Robbins | G02B 26/101 |
| 10,422,995 B2 | 9/2019 | Haddick | |
| 11,226,489 B2 | 1/2022 | Haddick | |
| 2003/0169405 A1 | 9/2003 | Agostinelli et al. | |
| 2006/0131492 A1 | 6/2006 | Kobayashi et al. | |
| 2010/0290127 A1 | 11/2010 | Kessler et al. | |
| 2014/0240843 A1 | 8/2014 | Kollin | |
| 2015/0198807 A1 | 7/2015 | Hirai | |
| 2015/0378074 A1 | 12/2015 | Kollin et al. | |
| 2016/0131454 A1 | 5/2016 | Jung et al. | |
| 2016/0139411 A1 | 5/2016 | Kang et al. | |
| 2016/0320559 A1 | 11/2016 | Richards | |
| 2019/0025589 A1 | 1/2019 | Haddick | |
| 2019/0137764 A1 | 5/2019 | Kang et al. | |
| 2020/0103659 A1 | 4/2020 | Ouderkirk et al. | |
| 2020/0348522 A1 | 11/2020 | Xiao et al. | |
| 2020/0348531 A1 | 11/2020 | Popovich et al. | |

FOREIGN PATENT DOCUMENTS

| | | | |
|---|---|---|---|
| CN | 101201532 | A | 6/2008 |
| CN | 101418927 | A | 4/2009 |
| CN | 101702045 | A | 5/2010 |
| CN | 101881887 | A | 11/2010 |
| CN | 201946235 | U | 8/2011 |
| CN | 202008041 | U | 10/2011 |
| CN | 102520478 | A | 6/2012 |
| CN | 102540465 | A | 7/2012 |
| CN | 202382166 | U | 8/2012 |
| CN | 202433604 | U | 9/2012 |
| CN | 103207426 | A | 7/2013 |
| CN | 203277499 | U | 11/2013 |
| CN | 103913806 | A | 7/2014 |
| CN | 104956253 | A | 9/2015 |
| CN | 105892058 | A | 8/2016 |
| CN | 205539729 | U | 8/2016 |
| CN | 106019591 | A | 10/2016 |
| CN | 106164746 | A | 11/2016 |
| CN | 206563849 | U | 10/2017 |
| CN | 107422480 | A | 12/2017 |
| CN | 107422481 | A | 12/2017 |
| CN | 107589546 | A | 1/2018 |
| CN | 108181709 | A | 6/2018 |
| CN | 108319018 | A | 7/2018 |
| CN | 108319019 | A | 7/2018 |
| EP | 1024388 | A2 | 8/2000 |
| JP | H0659217 | A | 3/1994 |
| JP | H08278476 | A | 10/1996 |
| JP | H09304730 | A | 11/1997 |
| JP | H11153772 | A | 6/1999 |
| JP | H11237584 | A | 8/1999 |
| JP | H11308640 | A | 11/1999 |
| JP | H11326818 | A | 11/1999 |
| JP | 2002122806 | A | 4/2002 |
| JP | 2002148559 | A | 5/2002 |
| JP | 2005077840 | A | 3/2005 |
| JP | 2007156096 | A | 6/2007 |
| JP | 2008533517 | A | 8/2008 |
| JP | 2010243751 | A | 10/2010 |
| JP | 2012508392 | A | 4/2012 |
| JP | 2017514168 | A | 6/2017 |
| JP | 2017120311 | A | 7/2017 |
| KR | 10-2008-0044040 | A | 5/2008 |
| KR | 20140046365 | A | 4/2014 |
| WO | 2012/118573 | A1 | 9/2012 |

OTHER PUBLICATIONS

Xu, Jun et al. "Colorful functional film", published on Jan. 2012; p. 180.
Rudolph Kings Lake, Academic Press, Inc. 1978 "Lens Design Fundamentals," p. 336.
Richard D. Hudson, Jr., John Wiley & Sons, Inc. 1969 "Infrared System Engineering," p. 117.
Notice of Rejection received in the corresponding Japanese Application 2020-565008, dated May 29, 2023.
Third Office Action received in the corresponding Chinese Application 201810147326.5, dated Oct. 25, 2023.

* cited by examiner

AUGMENTED REALITY APPARATUS, AND OPTICAL SYSTEM AND SEMI-REFLECTOR THEREFOR

FIELD

The present application relates to an augmented reality apparatus, especially a head-mounted augmented reality apparatus. The present application also relates to an optical system and a semi-reflector for the augmented reality apparatus.

BACKGROUND OF THE INVENTION

Augmented reality (AR) technology can be called as mixed display technology. Its principle is that an image projection source controllable by a computer is used to present an image, which is displayed for a user, to the eyes of the user, and the presented image is superposed with a real environmental image which can be directly seen by the eyes of the user so that real scene information augmented with the image presented via the computer is provided for the user. This kind of technology plays an increasingly important role in facilitating design and development of industrial products by designers. A head-mounted augmented reality (AR) apparatus is generally in the form of AR eyeglasses or a helmet.

A key factor of designing an optical system for the AR apparatus is how to enhance the design freedom, i.e. increase selectivity of adjustable parameters of the optical system. Therefore, if the design freedom can be enhanced, the overall performance of the optical system can be flexibly regulated as desired so as to improve the optical system's image quality.

In the optical system of the AR apparatus, a semi-reflector is generally used by which part of light from the image projection source is reflected towards the user's eyes and at the same time environmental light can enter the user's eyes. For the light from the image projection source, the semi-reflector is designed for one reflection of that light. That is, the optical system is designed such that its imaging performance can be regulated only by adjusting parameters relating to the reflection of the semi-reflector. If the semi-reflector could be innovated so as to increase the number of adjustable parameters, the design freedom of the optical system will definitely be enhanced so as to potentially improve the overall performance of the optical system.

SUMMARY OF THE INVENTION

Concerning the issues mentioned above, the present application is aimed at proposing an optical system and a semi-reflector which are used for an AR apparatus such that the optical system's design freedom can be enhanced and the overall performance can be improved.

According to an aspect of the present application, an optical system for an augmented reality (AR) apparatus is provided, comprising:
  an image projection source;
  a beam splitter, the beam splitter having a beam splitting side adjacent to the image projection source and a transmission side facing away from the image source; and
  a semi-reflector, the semi-reflector being arranged adjacent to the beam splitting side and being downstream of the beam splitting side in an optical path along which light emitted from the image projection source is reflected by the beam splitting side, the beam splitter being arranged such that the light emitted from the image projection source is able to be at least partially reflected by the beam splitting side towards the semi-reflector,
  wherein the semi-reflector comprises a substrate and a semi-reflective film on a distal surface of the substrate.

Because the semi-reflective film is on the distal surface of the substrate of the semi-reflector, the light emitted from the image source undergoes two refractions and one reflection at the semi-reflector before it enters the human eye for imaging. In this way, the design freedom of the whole optical system can be enhanced. The number of adjustable parameters for further improving the overall imaging quality of the optical system can be increased. In the meanwhile, the field of view can be enlarged, which facilitates the final imaging result in the human eye.

Optionally, a wave plate is arranged between the beam splitter and the semi-reflector, and preferably the wave plate is a quarter-wave plate. The wave plate or quarter-wave plate is used to improve the imaging's brightness and contrast, so as to reduce the apparatus's power consumption.

Optionally, the substrate of the semi-reflector is a wave plate, and preferably the wave plate is a quarter-wave plate. Integration of the wave or quarter-wave plate in the semi-reflector reduces the semi-reflector's volume, such that the mechanical structure of the whole optical system can be more flexibly designed. Furthermore, the integration can reduce the number of reflective interfaces, such that effects of stray light and "ghost" of the whole optical system can be reduced or eliminated to improve the contrast of the optical system.

Optionally, an anti-reflective film is applied over a proximal surface of the substrate. The anti-reflective film is used to increase the energy of light entering the substrate and thus improve the energy utilization efficiency in modulating light by refraction and reflection.

Optionally, the beam splitter is configured in such a way that when the light emitted from the image projection source is incident on the beam splitting side, a polarized light component, whose polarization is in a first direction, passes through the beam splitter to be transmitted through the transmission side, and a polarized light component, whose polarization is in a second direction perpendicular to the first direction, is reflected by the beam splitting side towards the wave plate, and wherein the beam splitter is also configured in such a way that when light is incident on the transmission side, a polarized light component, whose polarization is in the first direction, of the light is able to pass through the beam splitter to be transmitted from the beam splitting side, and a polarized light component, whose polarization is in the second direction, of the light is able to be absorbed in the beam splitter. In this way, unwanted light except for ambient light can be prevented from entering the human eye, such that the image quality and sharpness can be improved. The energy consumption of the AR apparatus can be reduced.

Optionally, the beam splitter comprises a polarizing beam splitting film and a polarizing film, wherein the polarizing beam splitting film is configured to allow polarized light, whose polarization is in the first direction, to be transmitted and polarized light, whose polarization is in the second direction to be reflected, wherein the polarizing film is configured to allow polarized light, whose polarization is in the first direction, to be transmitted and polarized light, whose polarization is in the second direction, to be absorbed, and wherein viewed in a direction of the light emitted from the image projection source, the polarizing beam splitting film is located upstream of the polarizing film to define the beam splitting side. In this way, the polarized light component whose polarization is in the second direction is ensured to be inevitably reflected by the polarizing beam splitting film to subsequently be processed through the wave or quarter-wave plate and the semi-reflector and finally enter the human eye for imaging. Optionally, an extraordinary axis and an ordinary axis of the wave plate are configured to include an angle with the first and second directions respectively, which angle is between 1° and 89°, preferably between 30° and 60°, more preferably 45°.

Optionally, the image projection source comprises a planar image source for emitting light, wherein the plane where the beam splitting side of the beam splitter locates is at a first angle relative to the normal of the image source, which first angle has a value of between 11° and 79°, preferably between 20° and 70°, more preferably between 30° and 60°, more preferably between and 55°, most preferably between 40° and 50°; and/or wherein the plane where the beam splitting side of the beam splitter locates is at a second angle relative to an optical axis of the semi-reflector, wherein 0<the second angle<90° and the second angle is between the first angle−10° and the first angle+10°. In this way, the utilization efficiency of the beam splitter can be maximized.

Optionally, the semi-reflector is a curved semi-reflector.

Optionally, the semi-reflector has a refractive power of between ±150 degrees, preferably ±100 degrees. In this way, it can ensure that the comfort of a user who uses the apparatus to watch the scene is not affected.

According to another aspect of the present application, a semi-reflector for the above-mentioned optical system is provided, wherein the semi-reflector comprises a substrate and a semi-reflective film located on a distal surface of the substrate. In this way, the whole optical system can be more flexibly designed. The number of adjustable parameters for further improving the overall imaging quality of the optical system can be increased. In the meanwhile, the field of view can be enlarged, which facilitates the final imaging result in the human eye.

Optionally, the substrate of the semi-reflector is a wave plate, and preferably the wave plate is a quarter-wave plate, so as to improve the imaging's brightness and contrast, further to reduce the apparatus's power consumption.

Optionally, an anti-reflective film is applied over a proximal surface of the substrate, so as to increase the energy of light entering the substrate and thus improve the energy utilization efficiency in modulating light by refraction and reflection.

Optionally, the semi-reflector is a curved semi-reflector.

Optionally, the semi-reflector has a refractive power of between ±150 degrees, preferably ±100 degrees.

According to another aspect of the present application, an augmented reality apparatus, especially a head-mounted augmented reality apparatus is provided, comprising a bracket and the optical system as mentioned above and integrated in the bracket.

Optionally, the bracket is an eyeglasses frame.

According to the inventive technical means mentioned above, the design freedom of the optical system can be skillfully enhanced without substantially changing the structural design of the optical system's elements. Therefore, this provides the basis for further improvement of the overall performance of the optical system. Moreover, the number and volume of the optical elements can be correspondingly reduced, which provides the basis for further miniaturizing the optical system. Furthermore, any stray light or "ghost" effect, which may occur in the optical system, can be eliminated and field of view can be enlarged as much as possible, so as to improve the image quality.

BRIEF DESCRIPTION OF THE VIEWS OF THE DRAWINGS

The foregoing and other aspects of the present application can be well understood by the following detailed description in combination with the attached drawings. It should be noted that the drawings may be given in different scales for purpose of clarity, which however does not affect understanding to the present application. In the drawings:

FIG. 6b is a view schematically illustrating an optical system including the semi-reflector of FIG. 6a;

DETAILED DESCRIPTION OF THE INVENTION

Figure 1:
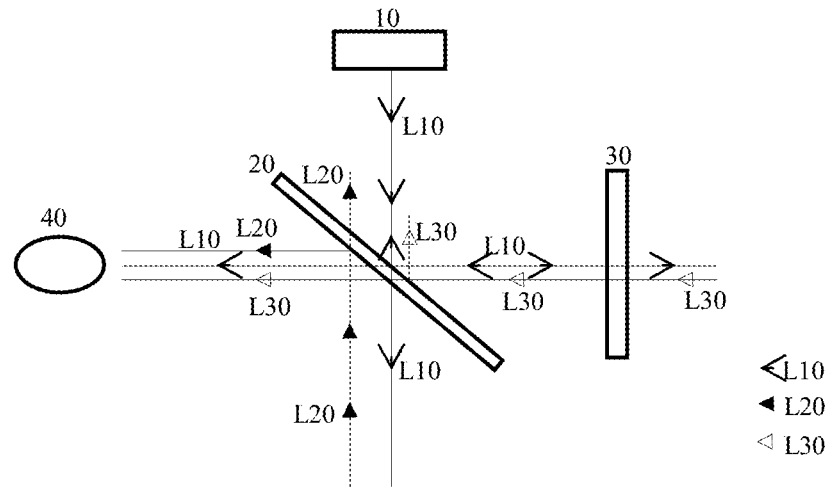
FIG. 1 is a view schematically illustrating an optical system of a conventional AR apparatus.

In the drawings of the present application, those features having the same configuration or similar function are represented by the same reference numerals. Further, it should be noted that for illustrative purposes only, light paths of optical systems shown by the drawings only show paths along which light propagates. However, this does not mean that those paths of light which are not shown do not exist in the light paths of the optical systems according to the present application.

FIG. 1 schematically illustrates an optical path diagram of an optical system of a conventional AR apparatus. The optical system of the conventional AR apparatus generally comprises an image projection source 10 controllable by a computer (not shown), a beam splitter 20 and a semi-reflector 30. Under control of the computer, the image projection source 10 can respectively emit light L10 emitted from the image projection source to exhibit a desired image. Along the light L10 emitted from the image projection source, the beam splitter 20 is arranged downstream of the image projection source 10. One part of the light L10 emitted from the image projection source is reflected by the beam splitter 20, and the other part of the light emitted from the image projection source is transmitted through the beam splitter 20. Along an optical path of the reflected light of the light L10 emitted from the image projection source, the semi-reflector 30 is arranged downstream of the beam splitter 20. The reflected light of the light L10 emitted from the image projection source is partially transmitted outwards through the semi-reflector 30 and is partially reflected by the same semi-reflector, wherein the reflected part of the light partially passes through the beam splitter 20 again to be seen by a human eye. At the same time, ambient light L30 can respectively pass through the semi-reflector 30 and then partially through the beam splitter 20 to be seen by the human eye 40. Therefore, an image presented by a portion of the light L10 emitted from the image projection source and an environmental image presented by a portion of the ambient light L30 are superposed in the human eye 40 such that a user can experience an augmented reality effect for real scene. In the above conventional optical system, in order to ensure that the part of the light L10 emitted from the image projection source being transmitted through the beam splitter 20 will not turn back to affect imaging, it is necessary to let that part of the light L10 emitted from the image projection source unimpededly exit to the surrounding environment.

Figure 2:
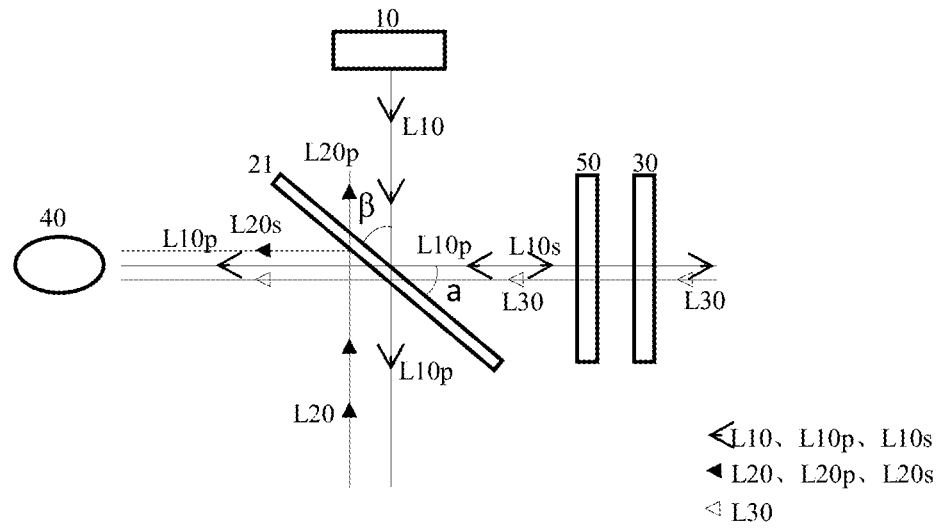
FIG. 2 is a view schematically illustrating an optical system of a modified AR apparatus.

In order to increase the energy utilization efficiency of the light L10 emitted from the image projection source, an optical system shown by FIG. 2 is proposed for the AR apparatus. For clarity, only features of the optical system of the AR apparatus that are different than the optical system shown by FIG. 1 will be explained below. Regarding other constituting elements, one can refer to the already-explained contents. As shown by FIG. 2, the optical system of the AR apparatus comprises a polarizing beam splitter 21 in place of the beam splitter 20. For instance, the polarizing beam splitter can be made by applying a polarizing beam splitting film on a (non-polarizing) splitter substrate. The polarizing beam splitter 21 is arranged in such a way that its polarizing beam splitting film is adjacent to the image projection source 10. The beam splitter substrate can achieve the same function as the beam splitter 20 shown by FIG. 1. The polarizing beam-splitter film is used to enable polarized light, whose polarization is in a first direction, to pass therethrough and polarized light, whose polarization is in a second direction perpendicular to the first direction, to be reflected thereby. For the purpose of clear description, the polarized light whose polarization is in the first direction and the polarized light whose polarization is in the second direction are respectively called, for example, as P-polarized light and S-polarized light below. Additionally, a quarter-wave plate 50 is arranged in an optical path between the polarizing beam splitter 21 and the semi-reflector 30.

In an embodiment, the splitter substrate's diopter is 0~800°.

In the context of the specification, a beam splitting side of the beam splitter refers to a surface or interface, defined by a constituent part of the beam splitter, wherein light can be incident on the surface or interface and/or can be partially reflected and be partially transmitted therethrough; a transmission side of the beam splitter refers to a surface or interface, defined by a constituent part of the beam splitter, wherein light can be incident on the surface or interface and/or can be transmitted therethrough out of the beam splitter. In the embodiment shown by FIG. 2, the polarizing beam splitting film of the beam splitter 21 defines its beam splitting side and the beam splitter substrate defines the transmission side of the beam splitter. In the beam splitter 20 shown by FIG. 1, a surface of the beam splitter 20 adjacent to the image projection source 10 is the beam splitting side, and a surface of the beam splitter 20 facing away from the image projection source 10 is the transmission side.

Furthermore, it should be understood that in the context of the specification, the beam splitter (or its splitter substrate) can be cubic or planar. For instance, in a cubic beam splitter comprised of two right angled isosceles triangle prisms, a bevel of the prism constitutes a beam-splitting side of the splitter. For instance again, in a planar splitter, a planar surface of the beam splitter's planar substrate constitutes a beam splitting side of the beam splitter.

For the purpose of clear description, polarized light whose polarization is in a P-direction will be assumed as the polarized light whose polarization is in the first direction and polarized light whose polarization is in an S-direction will be assumed as the polarized light whose polarization is in the second direction respectively below. However, one ordinary person in the art shall understand that the P-polarized light and the S-polarized light can be rotated about a path, along which light propagates, under the premise of ensuring that their polarizing directions are perpendicular to each other. Therefore, the light polarized in the first direction can be polarized light whose polarization is at an angle relative to the P-direction, and the light polarized in the second direction can be polarized light whose polarization is at the same angle relative to the S-direction.

In the context of the specification, the term "film" or "plate" refers to a thin-layer structure which can be attached to another thin-layer structure in the form of a "film" or "plate," or refers to a single thin-layer structure.

In the context of the specification, a plane where the beam splitting side of the beam splitter component locates is a plane where the beam splitting side substantially locates. The image projection source comprises a planar or curved image source capable of emitting light. In the context of the specification, the planar image source means that it has a substantially planar light-emitting side. Similarly, the curved image source means that it has a substantially curved light-emitting side. The image source can be made by an optical device such as an organic light-emitting diode (OLED), a liquid crystal on silicon (LCOS), a liquid crystal diode (LCD) or the like. A lens subassembly can comprise one or more lenses which are used to focus the light emitting from the image source so as to get clearer imaging. The plane where the beam splitting side of the beam splitter locates is at an angle β relative to the normal of the image source. The angle β has a value of between 11° and 79°, preferably between 20° and 70°, more preferably between 30° and 60°, more preferably between 40° and 55°, most preferably between 40° and 50°. The plane where the beam splitting side of the beam splitter locates is at an angle α relative to an optical axis of the semi-reflector, wherein the angle α is between β−10° and β+10° and 0<α<90°. In this way, the maximum utilization efficiency of the light energy can be achieved.

In the context of the present application, the term "between" relating to a range of value means that both end values of the range shall be considered as well. For instance, "a value A is between a value B and a value C" means that the value A can be the value B, the value C or a value which is greater than the value A but less than the value C.

Further as shown by FIG. 2, when light L10 emitted from the image projection source 10 passes through the polarizing beam splitter 21, a P-polarized light component L10p of the light L10 emitted from the image projection source is transmitted through the beam splitter and a S-polarized light component L10s of the light L10 emitted from the image projection source is reflected towards the semi-reflector 30 or the quarter-wave plate 50. When passing through the quarter-wave plate 50, the S-polarized light component L10s is converted into circularly polarized light (or elliptically polarized light). Then, the circularly polarized light (or the elliptically polarized light) is partially transmitted through and partially reflected by the semi-reflector 30. When passing through the quarter-wave plate 50 again, the reflected circularly polarized light (or the reflected elliptically polarized light) is converted into a P-polarized light component L10p. Subsequently, this P-polarized light component L10p passes through the polarizing beam splitter 21 to be seen by the human eye 40. In the meanwhile, ambient light L30 also sequentially passes through the semi-reflector 30 and the quarter-wave plate 50 and then partially through the beam splitter 21 to be seen by the human eye 40. Furthermore, when being incident on the polarizing beam splitter 21, unwanted light L20 is converted into a P-polarized light component L20p transmitted through the beam splitter and a S-polarized light component L20s reflected by the beam splitter, wherein only the S-polarized light component L20s can be seen by the human eye 40.

In the optical system shown by FIG. 1, the light energy of the light L10 emitted from the image projection source, when being incident on the beam splitter 20, loses half; then, the light energy of the light, when being incident on the semi-reflector 30, loses half; then, the light energy of the light, when being returned back and being incident on the beam splitter 20 again, loses half That is to say, only one eighth of the light energy of the initial light L10 emitted from the image projection source can be used for imaging in the human eye 40. In contrast, in the optical system shown by FIG. 2, the light energy of the light L10 emitted from the image projection source, when being incident on the beam splitter 21, loses half; then, the light energy of the light, when being incident on the semi-reflector 30, loses half; however, the light energy of the light, when being returned back and being incident on the beam splitter 20 again, will not lose any. That is to say, a quarter of the light energy of the initial light L10 emitted from the image projection source is used for imaging in the human eye 40, which substantially improves imaging brightness and contrast and thus reduces the apparatus's power consumption.

Figure 3:
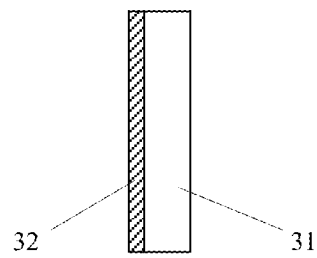
FIG. 3 is a cross-sectional view schematically illustrating a conventional semi-reflector.

FIG. 3 illustratively shows a cross-sectional view of the semi-reflector 30 used in the optical systems of FIGS. 1 and 2. The semi-reflector 30 comprises a transparent substrate 31 and a semi-reflective film 32 which is applied over a surface of the transparent substrate 31 facing towards the beam splitter 20 or 21. The semi-reflector 30 is used to enable light, incident on it, to be partially reflected by and partially transmitted through the same. Furthermore, it should be understood by the ordinary person in the art that the term "semi-reflector" or "semi-reflective film" does not mean that half the energy of light incident on it is reflected by the same and half the energy of the light is transmitted through the same. Rather, the ratio between the reflected light energy and the transmitted light energy can for instance depend on the characteristics of the "semi-reflector" or "semi-reflective film" itself. As shown, either the light L10 reflected by the beam splitter 20 or the S-polarized light component L10s of the light reflected by the polarizing beam splitter 21 is first incident on the semi-reflective film 32, and then the light (or its component) emitted from the image projection source, which can be used for imaging in the human eye 40, is partially reflected by the semi-reflective film 32 to the human eye 40. It can be seen that for the image projection source 10, if it is needed to improve the image quality by redesigning the semi-reflector 30, only the parameter of one optical element such as the semi-reflector 30 can be modified for consideration.

In a preferred embodiment, the substrate of the semi-reflector itself is an optical lens for refractive correction, for instance an optical lens used for correcting refractive errors.

In an embodiment, the substrate 31 has a diopter of 0~800°.

Figure 4A:
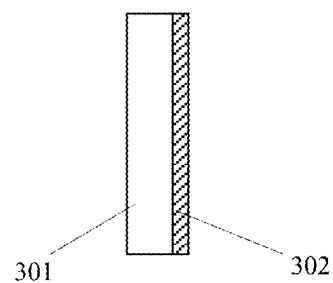
FIG. 4a is a cross-sectional view schematically illustrating a semi-reflector according to one embodiment of the present application.

FIG. 4a schematically illustrates a cross-sectional view of a semi-reflector 300 according to one embodiment of the present application. The semi-reflector 300 comprises a transparent substrate 301 and a semi-reflective film 302 being applied over a distal surface of the transparent substrate 301. In the context of the specification, a distal side or surface of the substrate or one optical element refers to a side or surface of the substrate or the optical element far away from the human, seen in a straight light path entering the human eye. Correspondingly, a proximal side or surface of the substrate or one optical element refers to a side or surface of the substrate or the optical element proximate to the human eye, seen in the straight light path entering the human eye. In an embodiment, the substrate 301 has a diopter of 0~800°.

Figure 4B:
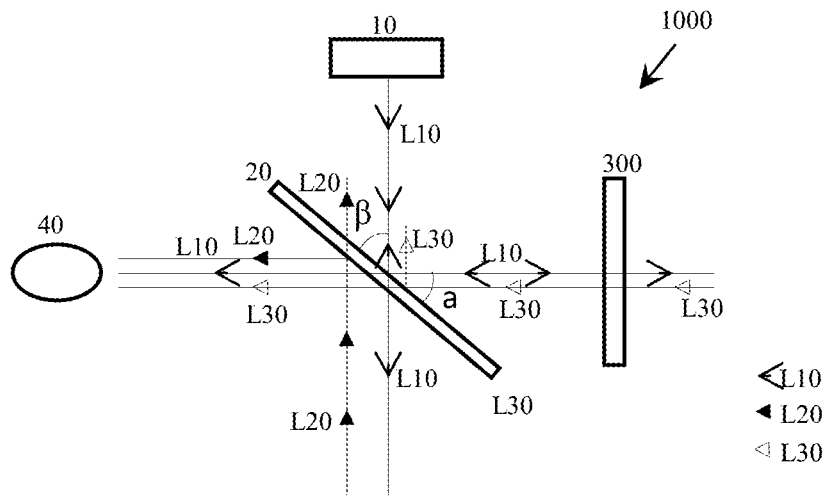
FIG. 4b is a view schematically illustrating how the semi-reflector of FIG. 4a is used in the optical system of FIG. 1.

FIG. 4b schematically illustrates an optical system 1000 which adopts the semi-reflector 300 of FIG. 4a. It should be understood by the ordinary person in the art that this optical system 1000 is different than the optical system 10 shown by FIG. 10 only in that the semi-reflector 30 of the latter is replaced by the semi-reflector 300 according to the present application. Therefore, other optical elements of the optical system 1000 except for the semi-reflector 300 refer to the already explained contents. As shown by FIGS. 4a and 4b, after a part of the light L10 emitted from the image projection source is reflected by the beam splitter 20, this part of the light L10 emitted from the image projection source will be first incident on the substrate 301 of the semi-reflector 300. Because refractive indexes of air and the substrate 301 are different than each other, a small fraction of light will be reflected at a proximal surface (which interfaces with air in the drawing) of the substrate 301 but much more portion of light will be refracted there. The refracted light continues to propagate in the substrate 301 towards its distal surface. When the light arrives at the distal surface of the substrate 301, one portion of the light is reflected backwards by the semi-reflective film 302 to the proximal surface of the substrate 301 and the other portion of the light is transmitted outwards through the semi-reflective film 302. The backwards reflected portion of the light propagates in the substrate 301 to its proximal surface again, and then is partially refracted towards air at the proximal surface. Finally, the refracted light passes through the beam splitter 20 for imaging in the human eye.

In the conventional optical system 10, at the semi-reflector 30, only one reflection of the light L10, emitted from the image projection source, capable of entering the human eye 40 occurs. However, in the inventive optical system 1000, at the semi-reflector 300, at least two refractions and one reflection of the light L10, emitted from the image projection source, capable of entering the human eye 40 occur. Therefore, using the inventive technical means, the design freedom for the whole optical system can be enhanced. For example, designers can redesign the refraction of light by varying the thickness or material property of the substrate 301 and reforming the proximal surface's morphology of the substrate 301, so as to change the optical performance of the whole optical system. Furthermore, because propagation of light in the substrate 301 relates to reflection and refraction, light at the final refraction will result in an effect of field-of-view enlargement, which facilitates final imaging results in the human eye.

Figure 4C:
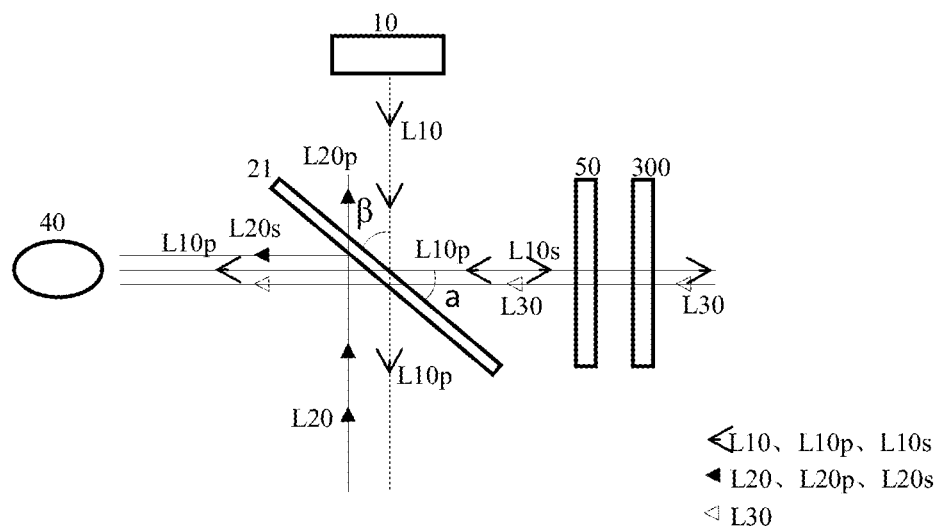
FIG. 4c is a view schematically illustrating how the semi-reflector of FIG. 4a is used in the optical system of FIG. 2.

In an alternative embodiment shown by FIG. 4c, the semi-reflector 300 shown by FIG. 4a can be used to replace the semi-reflector 30 of the optical system shown by FIG. 2. In this case, at the semi-reflector 300, the light component emitted from the image projection source, prior to entering the human eye, will be at least reflected twice and refracted once. This also enhances the design freedom for the whole optical system, and results in an effect of field-of-view enlargement, which facilitates final imaging results in the human eye.

Figure 5:
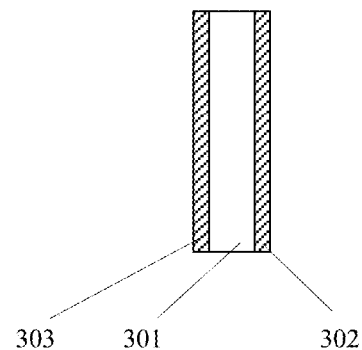
FIG. 5 is a cross-sectional view schematically illustrating a semi-reflector according to another embodiment of the present application.

FIG. 5 schematically illustrates a semi-reflector 310 according to another embodiment of the present application. Similar to the semi-reflector 300, this semi-reflector 310 comprises a transparent substrate 301 and a semi-reflective film 302 applied over a distal surface of the transparent substrate 301. Furthermore, the semi-reflector 310 also comprises an anti-reflective film 303 applied over a proximal surface of the transparent substrate 301. The anti-reflective film is used to increase the energy of light entering the substrate so as to improve the energy utilization efficiency of light which is modulated via refraction and reflection. It should be understood that the semi-reflector of the optical system shown by FIGS. 4b and 4c can be replaced by this semi-reflector 310 in alternative embodiments.

In the embodiment shown by FIG. 4c, a quarter-wave plate 50 is arranged to be spaced from the semi-reflector 300. In this way, a S-polarized light component L10s of the light, emitted from the image projection source, reflected at the beam splitter 21 will be reflected when it is incident on a proximal surface of the quarter-wave plate 50 and exits from a distal surface thereof. That is to say, a very small portion of the light component will be reflected due to variation between the media parameters of air and the quarter-wave plate. Furthermore, when a portion of circularly polarized light, which is converted by the S-polarized light component L10s passing through the quarter-wave plate 50, is reflected at the semi-reflector 300, this portion will be reflected again when passing through the distal and proximal surfaces of the quarter-wave plate 50. That is to say, a very small portion of the light component will be reflected due to variation between the media parameters of air and the quarter-wave plate. That is, light (or light component) entering the human eye 40 will undergo at least four micro-reflections. Those micro-reflections will result in undesired stray light and "ghost" effects in the final imaging result. Furthermore, spacing the quarter-wave plate 50 from the semi-reflector 300 also leads to a massive optical system.

Figure 6A:
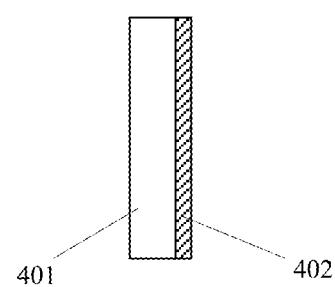
FIG. 6a is a cross-sectional view schematically illustrating a semi-reflector according to another embodiment of the present application.

Therefore, FIG. 6a schematically illustrates a semi-reflector 400 according to another embodiment of the present application. The semi-reflector 400 comprises a quarter-wave plate 401 and a semi-reflective film 402 applied over a distal surface of the quarter-wave plate 401. That is, in this embodiment, the quarter-wave plate 401 is a substrate of the semi-reflector 400. In the context of the present application, the quarter-wave plate is used to convert polarized light, whose polarization is in a second direction, into circularly polarized (or elliptically polarized) light and to convert the circularly polarized (or elliptically polarized) light into polarized light, whose polarization is in a first direction. An extraordinary axis and an ordinary axis of the wave plate are configured to include an angle with the first and second directions respectively, which angle is between 1° and 89°, preferably between 30° and 60°. In a preferred embodiment, the extraordinary axis and the ordinary axis of the wave plate are configured to be at 45° relative to both the first and second directions. For instance, the quarter-wave plate 401 can be made of a certain birefringent material such as an optical plastic material, an optical glass, an optical crystal or the like.

Figure 6B:
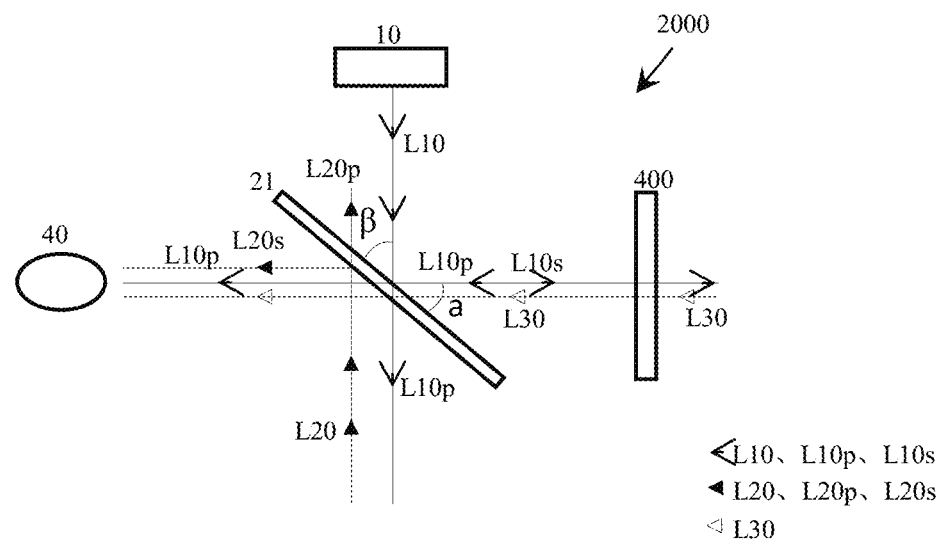

FIG. 6b is a view schematically illustrating an optical system 2000 including the semi-reflector 400 shown by FIG. 6a. The optical system 2000 comprises the image projection source 10 and the beam splitter 21 as shown by FIG. 2. Therefore, the contents of the image projection source 10 and the beam splitter 21 can refer to the previous explanations. Further, the optical system 2000 also comprises the semi-reflector 400. Therefore, when a S-polarized light component L10s of light from the image projection source reflected at the beam splitter is incident onto a proximal surface of the semi-reflector 400, it will propagate in the quarter-wave plate 401 of the semi-reflector 400 and is converted into circularly polarized (or elliptically polarized) light. A portion of the polarized light will be reflected backwards at the semi-reflective film 402 and continues to propagate in the quarter-wave plate 401 and, after being converted into a P-polarized light component L10p, exit from the proximal surface of the semi-reflector 400. Compared with the optical system shown by FIG. 4c, the number of reflection of light (or light component) in the optical system shown by FIG. 6c, prior to entering the human eye 40, caused by variation between the media parameters between air and the optical element will be greatly reduced, such that the unexpected stray light and "ghost" effects can be reduced or restrained and thus the image quality can be improved.

Furthermore, it should be understood by the ordinary person in the art that the semi-reflector of the present application can be curved, for instance partly-cylindrical or partly-spherical; or alternatively can be partly rotational-symmetric (non-spherical) or other suitable or freely curved. For instance again, in order not to affect the comfort of a user wearing the apparatus and watching the real scene, the inventive semi-reflector's whole diopter is between ±150 degrees, preferably ±100 degrees.

In a preferred embodiment, the semi-reflector 400 can comprise an anti-reflective film being applied over the proximal surface thereof, so as to improve the energy utilization efficiency of light.

It should be understood by the ordinary person in the art, after reading the description of the present application, that although the quarter-wave plate or film has been described here, the plate or film can be replaced in the present application by any other wave plate or retarder film or optical element, which can enable an additional optical path difference to be generated between two lights polarized perpendicular to each other, as long as the other wave plate or retarder film or optical element can achieve or substantially achieve similar functions as in those already mentioned technical solutions of the present application.

A beam shaping element of the image projection source is disposed in an optical path of light emitted from a source of the image source, so as to collimate, shape and/or combine light beams emitting form the image source.

According to the present application, the beam shaping element can be configured as a lens. The lens of the beam shaping element can be one lens or a lens subassembly comprised of lenses. The lens or each lens of the lens subassembly can be a positive lens, a negative lens, or any combination of the positive and negative lenses. The lens's surface can have a spherical surface, aspherical surface or freeform surface.

According to the present application's principles, the beam shaping element can be integrated into the image source by directly face-to-face adhesion for example through an adhesive, or alternatively integrated into the image source through an intermediate matching part. In other words, the image source and the beam shaping element of the image projection source of the AR apparatus according to the present application are directly integrated together or indirectly integrated together through the intermediate matching part, as an integral piece. The intermediate matching part is made of a matching media which is not air and whose refractive index is greater than 1. In this way, light beams VL emitting from the image source and carrying virtual image information can enter the beam shaping element directly or through the matching medium whose refractive index is greater than 1. Thereafter, they exit from the image projection source through the beam shaping element.

Preferably, the refractive index of the matching medium for forming the intermediate matching part can be 1~2.7. The matching medium for forming the intermediate matching part can be a liquid medium, a liquid crystal medium, a semi-solid medium or a solid medium. The intermediate matching part can be formed by at least one of the mentioned mediums. The liquid medium can be a transparent medium such as water or ethyl alcohol. The solid medium can be a transparent solid medium such as glass or resin.

Figure 7:
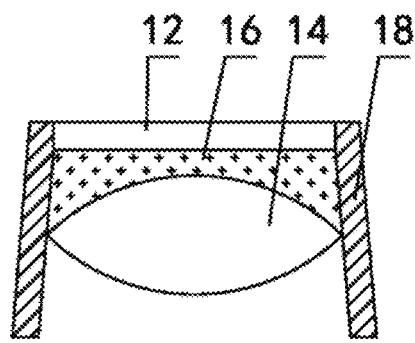
FIG. 7 is a cross-sectional view schematically illustrating an image projection source of an AR apparatus according to one embodiment of the present application.

FIG. 7 illustrates an example of the image projection source of the AR apparatus according to the present application. In this example, an image source 12 and a beam shaping element 14 are indirectly integrated together by an intermediate matching part 16. In this example, the beam shaping element 14 is provided as a lens, and the intermediate matching part 16 is formed by a liquid and/or liquid crystal medium. Consequently, the image projection source 10 comprises a seal structure by which the liquid or liquid medium can be sealed between the image source 12 and the beam shaping element 14. It is understood that the seal structure can be any suitable seal structure known in the art.

In a feasible embodiment, the seal structure comprises a seal frame 18. The seal frame 18 is adhered to the image source 12 to achieve seal therebetween. Seal between the seal frame 18 and the lens of the beam shaping element 14 can be achieved by inlay engagement therebetween. Optionally, depending on the form of medium used to make the intermediate matching part 16, the seal frame 18 can be adhered to the lens of the beam shaping element 14.

According to such a configuration, light beams emitting from the image source 12 and carrying virtual image can enter first the intermediate matching part 16 and then the beam shaping element 14 which is in the form of a lens. As the refractive index of the matching medium is greater than that of air, the refractive index's difference between the medium, by which the lens of the beam shaping element 14 is formed, and the matching medium is less than the refractive index's difference between the medium, by which the lens of the beam shaping element 14 is formed, and air at an interface between the intermediate matching part 16 and the beam shaping element 14. Therefore, much more light beams can be refracted such that light transmittance can be improved and the image projection source's optical efficiency can be increased. Consequently, less light beams can be reflected at the interface such that occurring of stray light and ghost image can be restrained or reduced.

It is observed from an equation $R=(0.61*\lambda)/(n*\sin\theta)$, wherein R is the radius of an Airy disc, $\lambda$ is the wavelength of the light, n is the refractive index in image space and $\theta$ is the incidence aperture angle, that as the refractive index of the matching medium becomes greater, the produced Airy disc will become smaller and thus the imaging resolution can be increased. Furthermore, because the refractive index becomes greater at the imaging side, a great numerical aperture can be obtained with a relatively smaller aperture angle and the bending angle of marginal light beams can be reduced, which results in less design difficulty. Moreover, since the image source is integrated together with the beam shaping element, the optical structure is more compact and more easily installed and adjusted, and thus is more systemic.

Figure 8:
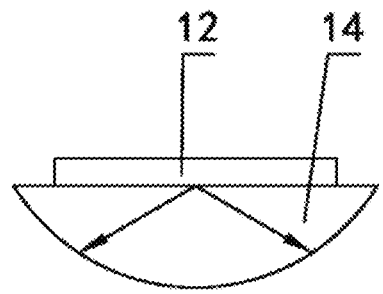
FIG. 8 is a cross-sectional view schematically illustrating an image projection source of the AR apparatus according to another embodiment of the present application.

FIG. 8 illustrates another example of the image projection source of the AR apparatus according to the present application. In this example, an image source 12 and a beam shaping element 14 are integrated together in a manner of face-fitting. The image source 12 and the beam shaping element 14 have complementary contact sides which can be fitted onto each other. As one example, a lens, by which the beam shaping element 14 is formed, is adhered to the image source 12. Alternatively, the image source 12 and the beam shaping element 14 can be firmly fitted onto each other via any other suitable manner known by the ordinary person in the art.

According to such a configuration, source light beams emitting from the image source 12 directly enters the lens forming the beam shaping element 14. Such a configuration can provide all benefits as those described with respect to FIG. 7. Additionally, in such a configuration, the image source is directly fitted onto the lens such that the optical structure can be more compact, smaller, lighter and is more comfortable to be worn. The more compact structure ensures that it is easy to be installed and adjusted.

Some possible examples of the image projection source according to the present application have been explained with respect to FIGS. 7 and 8. It should be understood by the ordinary person in the art that those are not all of examples of the image projection source according to the present application. According to the present application, such an embodiment, in which the image projection source is integrated together with the beam shaping element, is also feasible. It should be understood by the ordinary person in the art that according to the present application the image projection source can be used in combination with a light path module no matter how which is comprised of and no matter what kind of function which has. The light path module used in combination with the image projection source of the present application can comprise any number of optical elements, optical elements having various functions or any combination of optical elements feasibly arranged.

According to an optional embodiment of the present application, the image projection source comprises an image source and a beam shaping element integrated with each other as a unitary piece, in which light beams emitting from the image source are shaped by the beam shaping element to exit from the image projection source. Optionally, the beam shaping element is directly integrated into the image source. For instance, the beam shaping element is adhered to the image source in a manner of face-fitting. Optionally, the beam shaping element can be indirectly integrated into the image source via an intermediate matching part. Optionally, the intermediate matching part is formed by at least one selected from a group comprised of a liquid medium, a liquid crystal medium, a semi-solid medium and a solid medium.

Optionally, the intermediate matching part is formed by any one selected from a group comprised of water, ethyl alcohol, glass and resin.

Optionally, the intermediate matching part is formed by a liquid medium and/or a liquid crystal medium, and the image projection source also comprises a seal structure by which the medium forming the intermediate matching part is sealed between the image source and the beam shaping element.

Optionally, the medium of the intermediate matching part has a refractive index of 1~2.7.

Optionally, the beam shaping element is configured as a positive lens or configured as a negative lens or configured as a combination of positive and negative lenses.

Figure 9:
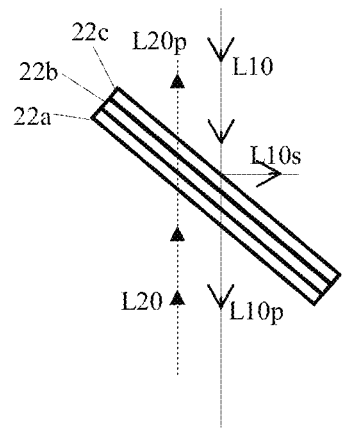
FIG. 9 is an enlarged view schematically illustrating a beam splitter according to one embodiment of the present application.

FIG. 9 is an enlarged view illustrating a beam splitter 22 according to an embodiment of the present application. The beam splitter is a three-layer structure, comprising a beam splitter substrate 22a, a polarizing film 22b and a polarizing beam splitting film 22c in this order. The beam splitter substrate 22a can be a light splitter well-known in the art, for example a non-polarizing beam splitter. The polarizing film 22b is a film allowing polarized light, whose polarization is in a first direction, to pass therethrough but absorbing polarized light whose polarization is in a second direction perpendicular to the first direction. The polarizing beam splitting film 22c is a film allowing the polarized light, whose polarization is in the first direction, to be transmitted therethrough and the polarized light, whose polarization is in the second direction, to be reflected.

In an alternative embodiment where the beam splitter 21 of FIG. 2 is replaced by the beam splitter 22, When light L10 emitted from the image projection source is incident on the polarizing beam splitting film 22c (the beam splitting side) of the beam splitter 22, the P-polarized light component L10p of the light L10 emitted from the image projection source is transmitted through the polarizing beam splitting film 22c and further through the polarizing film 22b to exit from a transmission side of the beam splitter 22. The S-polarized light component L10s of the light L10 emitted from the image projection source is reflected towards the quarter-wave plate. When passing through the quarter-wave plate, the S-polarized light component L10s is converted into circularly polarized light. When arriving in the semi-reflector 30, the circularly polarized light is partially transmitted therethrough and is partially reflected thereby. The reflected circularly polarized light passes through the quarter-wave plate again and then is converted into a P-polarized light component L10p. Subsequently, the P-polarized light component L10p is incident on the polarizing beam splitting film 22c (the beam splitting side) of the beam splitter 22, and passes through the same and the polarizing film 22b to be seen by the human eye 40. In the meanwhile, ambient light L30 passes through the semi-reflector 30 and the quarter-wave plate in this order and partially through the beam splitter component 22 to be seen by the human eye 40. Furthermore, when unwanted light L20 is incident on the beam splitter substrate 22a (the transmission side) of the beam splitter 22, an S-polarized light component of the unwanted light is absorbed by the polarizing film 22b and a P-polarized light component of the unwanted light passes through the polarizing film 22b and subsequently through the polarizing beam splitting film 22c. Therefore, in the case that the beam splitter of the already mentioned optical system is replaced by the beam splitter 22, ideally, no light component of the unwanted light L20 can transmit towards the human eye 40 such that influence of the unwanted light on the user's observation is completely eliminated or weakened, and thus the whole optical system's image quality is improved.

In an alternative embodiment, positions of the beam splitter substrate 22a and the polarizing film 22b are interchangeable. Even in an alternative embodiment, the beam splitter substrate 22a can be dispensed with.

In practical production, because the beam splitter substrate or the film itself has a thickness, not all of the light L10 emitted from the image projection source, upon being incident on the beam splitter component 22, can be modulated by the polarizing film 22b and the polarizing beam splitting film 22c. That is to say, there is a possibility that a very small portion of the component of the light L10 emitted from the image projection source may be transmitted onto the transmission side of the beam splitter component 22. Due to interface of the transmission side with air, this very small portion of the component of the light L10 emitted from the image projection source may be reflected towards the polarizing film 22b and the polarizing beam splitting film 22c. Finally, this very small portion of the component of the light L10 emitted from the image projection source may result in "interference of ghost" in imaging of the whole optical system, which thus affects the image quality that can be seen by the human eye 40.

Figure 10:
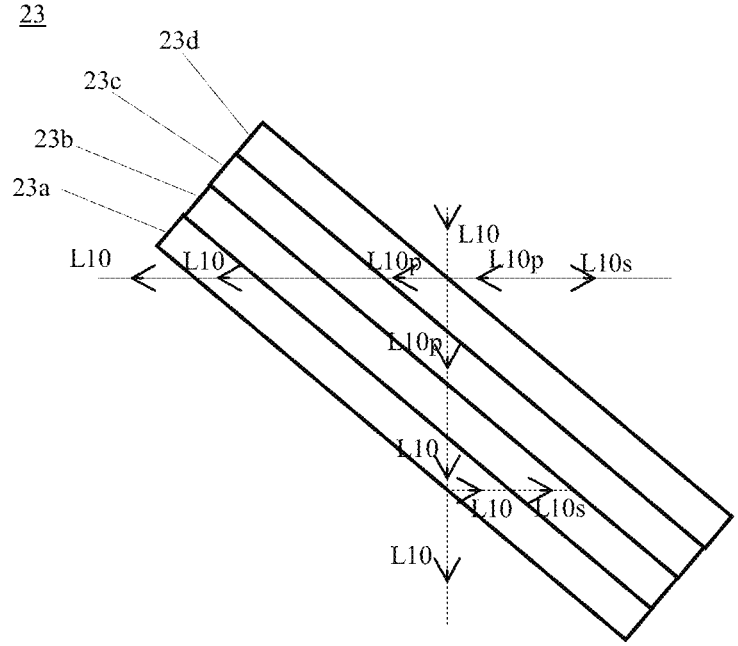
FIG. 10 is an enlarged view schematically illustrating a beam splitter according to another embodiment of the present application.

FIG. 10 is an enlarged view illustrating a beam splitter 23 according to another embodiment of the present application. The beam splitter 23 is a four-layer structure, comprising a beam splitter substrate 23a, a quarter-retarder film 23b, a polarizing film 23c and a polarizing beam splitting film 23d in this order. For example, they are sequentially adhered together as a unitary piece. The polarizing beam splitting film 23d defines a beam splitting side of the beam splitter 23, and the beam splitter substrate 23a defines a transmission side of the beam splitter 23. In the beam splitter 23, the beam splitting side and the transmission side are separated by the quarter-retarder film 23b and the polarizing film 23c.

Further, as shown by FIG. 10, when light L10 emitted from the image projection source is incident on the polarizing beam splitting film 23d (the beam splitting side) of the beam splitter 23, a P-polarized light component L10p of the light L10 emitted from the image projection source is converted by the quarter-retarder film 23b into circularly polarized light. When the circularly polarized light propagates in the beam splitter substrate 23a to an interface with air (the transmission side), a small portion of the circularly polarized light will be reflected at the interface towards the quarter-retarder film 23b within the beam splitter substrate 23a because the medium parameters of the air and the substrate are obviously different than each other at the interface. When passing through the quarter-retarder film 23b again, the reflected circularly polarized light will be converted into an S-polarized light component since its polarization direction is changed by 90°. Subsequently, the S-polarized light component is absorbed by the adjacent polarizing film 23c. Therefore, "interference of ghost" can be substantially reduced. In the embodiment shown by FIG. 10, from the transmission side to the beam splitting side of the beam splitter 23, the beam splitter substrate 23a, the quarter-retarder film 23b, the polarizing film 23c and the polarizing beam splitting film 23d are arranged in this order. In an alternative embodiment, from the transmission side to the beam splitting side of the beam splitter 23, the quarter-retarder film, the beam splitter substrate, the polarizing film and the polarizing beam splitting film can be re-arranged in this order. In an alternative embodiment, from the transmission side to the beam splitting side of the beam splitter 23, the quarter-retarder film, the polarizing film, the beam splitter substrate and the polarizing beam splitting film can be re-arranged in this order. In an alternative embodiment, from the transmission side to the beam splitting side of the beam splitter 23, the quarter-retarder film, the polarizing film, the polarizing beam splitting film and the beam splitter substrate can be re-arranged in this order. In an alternative embodiment, the beam splitter substrate can be even dispensed with.

According to an optional embodiment of the present application, an optical system for an augmented reality (AR) apparatus is provided, comprising:
 an image projection source;
  a beam splitter having a beam splitting side adjacent to the image projection source and a transmission side facing away from the image projection source;
  a wave plate adjacent to the beam splitting side, and the beam splitter being arranged in such a way that light emitted from the image projection source is able to be non-perpendicularly incident on the beam splitting side and at least partially reflected towards the wave plate; and
  a semi-reflector located downstream of the wave plate in a reflected light path,
  wherein the beam splitter is configured such that when the light emitted from the image projection source is incident on the beam splitting side, a polarized light component, whose polarization is in a first direction, passes through the beam splitter to be transmitted through the transmission side, and a polarized light component, whose polarization is in a second direction perpendicular to the first direction, is reflected by the beam splitting side towards the wave plate; and the beam splitter is also configured in such a way that when light is incident on the transmission side, a polarized light component, whose polarization is in the first direction, of the light is able to pass through the beam splitter to be transmitted from the beam splitting side, and a polarized light component, whose polarization is in the second direction, of the light is able to be absorbed in the beam splitter. Preferably, the wave plate is a quarter-wave plate. Therefore, the energy of the light, emitted from the image projection source, entering the human eye can be increased, and except for ambient light, unwanted light entering the human eye can be blocked or reduced, such that the image quality and sharpness can be improved and the power consumption of the AR apparatus can be reduced.

Optionally, the beam splitter comprises a polarizing beam splitting film and a polarizing film, wherein the polarizing beam splitting film is configured in such a way that light polarized in the first direction is allowed to pass therethrough and light polarized in the second direction is reflected thereby, wherein the polarizing film is configured in such a way that light polarized in the first direction is allowed to pass therethrough and light polarized in the second direction is absorbed therein, and wherein viewed in a direction of the light emitted from the image projection source, the polarizing beam splitting film is located upstream of the polarizing film to define the beam splitting side. In this way, the polarized light component whose polarization is in the second direction is ensured to be inevitably reflected by the polarizing beam splitting film so as to subsequently be processed by the wave plate or quarter-wave plate and the semi-reflector and then enter the human eye for imaging.

Optionally, the transmission side is defined by the polarizing film so as to increase the energy utilization efficiency of light.

Optionally, the beam splitter also comprises a beam splitter substrate located between the polarizing beam splitting film and the polarizing film so as to improve the integral strength of the beam splitter.

Optionally, the beam splitter also comprises a beam splitter substrate, wherein the polarizing film is located between the beam splitter substrate and the polarizing beam splitting film, and wherein the transmission side is defined by the beam splitter substrate so as to improve the integral strength of the beam splitter.

Optionally, the beam splitter also comprises a beam splitter substrate, wherein the polarizing beam splitting film is located between the beam splitter substrate and the polarizing film, and wherein the transmission side is defined by the polarizing film so as to improve the integral strength of the beam splitter.

Optionally, the beam splitter also comprises a retarder film, wherein the polarizing film is located between the retarder film and the polarizing beam splitting film so as to eliminate the "interference of ghost" effect and improve the energy utilization efficiency of light. Preferably, the retarder film is a quarter-retarder film.

Optionally, the beam splitting side is defined by the polarizing beam splitting film, and the transmission side is defined by the retarder film so as to eliminate the "interference of ghost" effect and improve the energy utilization efficiency of light.

Optionally, the beam splitter also comprises a beam splitter substrate, wherein the retarder film and the polarizing film are located between the beam splitter substrate and the polarizing beam splitting film, and the transmission film is defined by the beam splitter substrate so as to eliminate the "interference of ghost" effect and improve the integral strength of the beam splitter structure.

Optionally, the beam splitter also comprises a beam splitter substrate, wherein the beam splitter substrate and the polarizing film are located between the retarder film and the polarizing beam splitting film, and the transmission side is defined by the retarder film so as to eliminate the "interference of ghost" effect and improve the integral strength of the beam splitter structure.

Optionally, the beam splitter also comprises a beam splitter substrate, wherein the polarizing beam splitting film is located between the polarizing film and the beam splitter substrate so as to eliminate the "interference of ghost" effect and improve the integral strength of the beam splitter structure.

Optionally, the image projection source comprises a planar image source for emitting light, wherein the plane where the beam splitting side of the beam splitter locates is at a first angle relative to the normal of the image source, which first angle has a value of between 11° and 79°, preferably between 20° and 70°, more preferably between 30° and 60°, more preferably between 40° and 55°, most preferably between 40° and 50°; and/or wherein the plane where the beam splitting side of the beam splitter locates is at a second angle relative to an optical axis of the semi-reflector, wherein 0<the second angle<90° and the second angle is between the first angle−10° and the first angle+10°.

Optionally, the wave plate is integrated together with the semi-reflector so as to reduce the volume of the entire system.

Moreover, the integration can reduce the number of reflective interfaces, such that stray light occurring in the whole optical system can be reduced or the effect of "interference of ghost" can be weakened, so as to increase the optical system's contrast.

Figure 11:
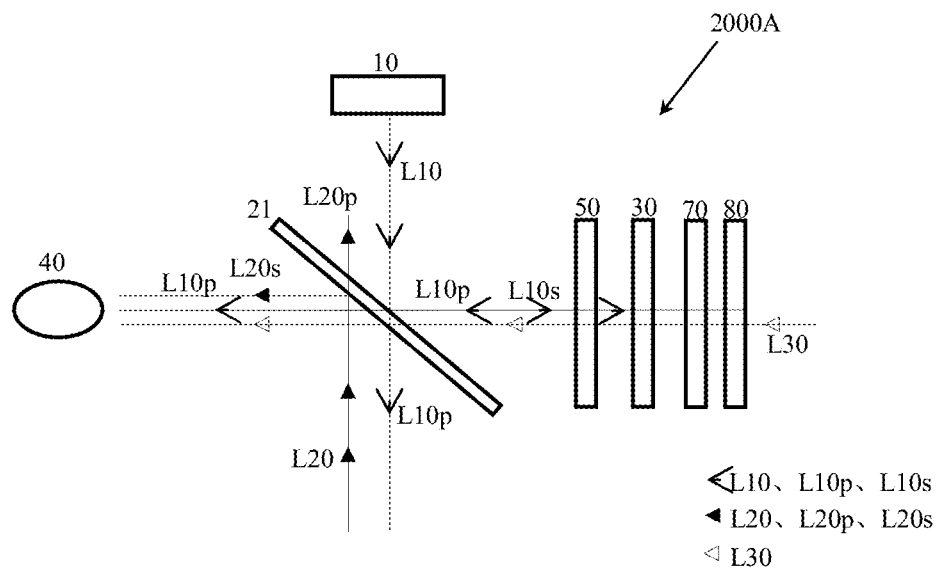
FIG. 11 is a view schematically illustrating an optical system 2000A of the AR apparatus according to another embodiment of the present application.

FIG. 11 schematically illustrates an optical system 2000A of the AR apparatus according to another embodiment of the present application. The optical system 2000A generally comprises an image projection source 10 controllable by a computer (not shown), a polarizing beam splitter 21 and a semi-reflector 30, wherein a quarter-wave plate 50 is arranged in an optical path between the polarizing beam splitter 21 and the semi-reflector 30. Designs of the image projection source 10, the polarizing beam splitter 21, the semi-reflector 30 and the quarter-wave plate 50 can refer to the already-mentioned contents. Additionally, in an optical path along which light emitted from the image projection source 10 is reflected distally by the beam splitting side, a secondary quarter-wave plate 70 and a polarizer 80 are sequentially arranged distal to the semi-reflector 30 of the optical system 2000A, wherein the polarizer 80 is located distal to the secondary quarter-wave plate 70. The quarter-wave plate 70 is configured in such a way that circularly polarized light can be converted into linearly-polarized light whose polarization is in a first or second direction, and the polarizer 80 is configured to absorb said linearly-polarized light. For example, the quarter-wave plate 70 can be configured to convert circularly polarized light into S-polarized light, and the polarizer 80 can be configured to enable P-polarized light to pass therethrough and to absorb S-polarized light. For example again, the quarter-wave plate 70 can be configured to convert circularly polarized light into P-polarized light, and the polarizer 80 can be configured to enable S-polarized light to pass therethrough and to absorb P-polarized light. An extraordinary axis or an ordinary axis of the quarter-wave plate 70 is configured such that the axis can be at an angle relative to the polarization direction of polarized light passing through the polarizer 80, which angle is between 30 and 60 degrees. Preferably, the extraordinary axis or the ordinary axis of the quarter-wave plate 70 is configured such that the axis is at an angle of 45 degrees relative to the polarization direction of polarized light passing through the polarizer 80.

As shown by FIG. 11, when the light L10 emitted from the image projection source 10 passes through the polarizing beam splitter 21, the P-polarized light component L10$p$ of the light L10 emitted from the image projection source is transmitted therethrough, and the S-polarized light component L10$s$ of the light L10 emitted from the image projection source is reflected towards the semi-reflector 30 or the quarter-wave plate 50. When passing through the quarter-wave plate 50, the S-polarized light component L10$s$ is converted into circularly polarized light (or elliptically polarized light). Subsequently, the circularly polarized light (or the elliptically polarized light) will be partially reflected by the semi-reflector 30 and be partially transmitted therethrough. In case of circularly polarized light, the transmitted circularly polarized light, upon passing through the quarter-wave plate 70, can be converted into S-polarized light (or P-polarized light) which is then incident on the polarizer 80, which is configured to absorb the S-polarized light (or the P-polarized light) and enable the P-polarized light (or the S-polarized light) to be transmitted therethrough, and is absorbed by the polarizer 80. In this way, no or less light L10 emitted from the image projection source can exit from the AR apparatus. In case of elliptically polarized light, most of the transmitted elliptically polarized light will be absorbed so as to be prevented from escaping out of the AR apparatus. The privacy for the AR apparatus and the interactivity for users can be improved.

In an optional embodiment, the wave plate 70 is adhered to the polarizer 80 so as to reduce the number of interfaces at which light passing through them may be transmitted or reflected. In this way, the utilization efficiency of light can be increased.

In the case that the semi-reflector 30 is a curved semi-reflector, shapes of the wave plate 70 and the polarizer 80 in a lateral direction follows the semi-reflector's curved shape. In the context of the present application, the lateral direction generally refers to the coronal direction of a user of the AR apparatus. Therefore, negative effects of "ghost" can be reduced and the image quality can be enhanced. Optionally, the additional wave plate and the additional polarizer are shaped in a longitudinal direction generally perpendicular to the lateral direction to follow the semi-reflector's curved shape. Optionally, the semi-reflector is a curved semi-reflector such that the additional wave plate and the additional polarizer are shaped to substantially follow the semi-reflector's curved shape to achieve an optimal effect that "interference of ghost" can be reduced.

In an optional embodiment, the optical system also comprises a transparent protective sheet located distal to the additional polarizer. The wave plate 70 and the polarizer 80 are located between the semi-reflector 30 and the transparent protective sheet so that a negative effect of "ghost" caused by that ambient light enters the transparent protective sheet and is reflected at a distal surface of the semi-reflector 30 is alleviated. Furthermore, if light leaks out the polarizer 80 due to the optical element's performance, a negative effect of "ghost" caused by reflection of the leaking light at the transparent protective sheet can also be reduced. The transparent protective sheet can be a light energy attenuation sheet, a photochromic sheet or an electrochromic sheet.

Figure 12:
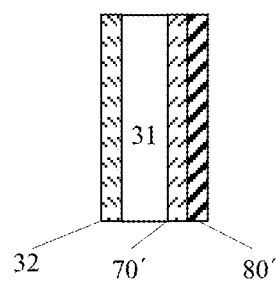
FIG. 12 is a cross-sectional view schematically illustrating a semi-reflector according to another embodiment of the present application.

FIG. 12 is a cross-sectional view schematically illustrating a semi-reflector 30' according to an embodiment of the present application. The semi-reflector 30' comprises a transparent substrate 31 and a semi-reflective film 32 applied over a proximal surface of the transparent substrate 31. Furthermore, the semi-reflector 30' also comprises a quarter-retarder film 70' and a polarizing film 80' which are applied over a distal surface of the substrate 31 in this order. The quarter-retarder film 70' and the polarizing film 80' are configured in the same manner as the quarter-wave plate 70 and the polarizer 80 respectively. Therefore, because the semi-reflector 30' itself is integrated with the quarter-retarder film 70' and the polarizing film 80', the volume of the optical system can be further reduced. In the meanwhile, the number of reflective interfaces can be reduced so as to eliminate stray light appearing in the whole optical system and thus to increase the contrast of the optical system.

Figure 13:
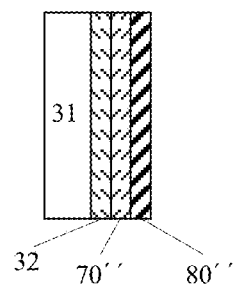
FIG. 13 is a cross-sectional view schematically illustrating a semi-reflector according to another embodiment of the present application.

Optionally, FIG. 13 is a cross-sectional view schematically illustrating a semi-reflector 30" according to another embodiment of the present application. The semi-reflector 30" comprises a transparent substrate 31 and a semi-reflective film 32 applied over a distal surface of the transparent substrate 31. Furthermore, the semi-reflector 31" also comprises a quarter-retarder film 70" and a polarizing film 80" which are applied over the semi-reflector 32 in this order. The quarter-retarder film 70" and the polarizing film 80" are configured in the same manner as the quarter-wave plate 70 and the polarizer 80 respectively.

In the case that the semi-reflector 30' or the semi-reflector 30" is alternatively used in the already-mentioned optical system (FIG. 2), the S-polarized light component L10s, when being reflected at the beam splitting side of the beam splitter, is converted into circularly polarized light by the quarter-wave plate 50. When this circularly polarized light is incident on the semi-reflector 30' or 30", a light component of the circularly polarized light transmitted through the semi-reflective film 32 or light components of the circularly polarized light other than that directly reflected at the semi-reflective film 32 are converted into linearly-polarized light, which is subsequently absorbed, according to the principle illustrated in FIG. 11. Therefore, the light emitted from the image projection source 10 is prevented from escaping out of the AR apparatus. In this way, the privacy for the AR apparatus and the interactivity for users can be improved.

In an alternative embodiment, the substrate 31 of the semi-reflector 31' can be formed in the form of the quarter-wave plate 70. Therefore, the quarter-retarder film 70' can be dispensed with.

According to an optional embodiment of the present application, an optical system for an AR apparatus is provided, which optical system comprises:
  an image projection source; and
  a polarizing beam splitter, wherein the polarizing beam splitter includes a beam splitting side adjacent to the image projection source and a transmission side facing away from the image projection source, wherein the polarizing beam splitter is arranged in such a way that light emitted from the image projection source is able to be non-perpendicularly incident on the beam splitting side and be at least partially reflected, wherein the polarizing beam splitter is configured such that when light is incident on the beam splitting side, a polarized light component, whose polarization is in a first direction, passes through the polarizing beam splitter to be transmitted through the transmission side and a polarized light component, whose polarization is in a second direction perpendicular to the first direction, is reflected by the beam splitting side,
  wherein the optical system also comprises a polarizer disposed between the image projection source and the beam splitting side of the polarizing beam splitter, and wherein the polarizer is configured in such a way that light polarized in the second direction is able to be transmitted therethrough and light polarized in the first direction is able to be absorbed.

Providing the polarizer decreases or eliminates the possibility that the light emitted from the image projection source can be seen by a human eye of the user without being reflected by the polarizing beam splitter, such that the comfort of a user who uses the apparatus can be enhanced.

Optionally, the polarizer is integrated within the image projection source such that light polarized in the second direction can exit from the image projection source. In this way, the volume of the optical system can be reduced to enable the apparatus to be more compact. Furthermore, the number of reflective interfaces can be reduced such that stray light in the whole optical system can be reduced or "ghost" effects can be weakened, and thus the contrast of the optical system can be enhanced.

Optionally, the optical system also comprises a wave plate which is adjacent to the beam splitting side, wherein the light emitted from the image projection source is able to be partially reflected by the beam splitting side towards the wave plate; and the optical system also comprises a semi-reflector located downstream of the wave plate in an optical path of the reflected light, wherein the wave plate is preferably a quarter-wave plate. In this way, the light energy utilization efficiency of the optical system can be improved and thus the power consumption of the AR apparatus can be reduced.

Optionally, the wave plate is a retarder film being applied over a proximal surface of the semi-reflector. Therefore, the volume of the optical system can be reduced so as to enable the apparatus to be more compact. Furthermore, the number of reflective interfaces can be reduced, such that stray light in the whole optical system can be reduced or "ghost" effects can be weakened, and thus the contrast of the optical system can be enhanced.

Optionally, the polarizer is arranged in such a way that the optical path of the reflected light cannot be affected and thus the final imaging results in the human eye will not be affected.

Optionally, the image projection source comprises an image source which can be controlled to emit light and a lens for focusing the emitting light, wherein the polarizer is located between the image source and the lens.

Optionally, the image source, the polarizer and the lens are adhered together; or alternatively the polarizer is adhered on one of the image source and the lens. Adhering together can reduce the number of reflective interfaces between optical elements, such that light energy loss can be reduced and thus the effect of stray light can be eliminated or weakened, and the image quality can be enhanced.

Optionally, the polarizer is a polarizing film.

Optionally, the image projection source comprises an image source which can be controlled to emit light and a lens for focusing the emitting light, wherein the lens is located between the image source and the polarizer.

Optionally, the polarizer is a polarizing film applied over a surface of the lens.

Optionally, the image source also comprises a matching lens located between the image source and the lens, wherein the polarizer is located between the image source and the matching lens or between the matching lens and the lens.

Optionally, the image source, the matching lens, the polarizer and the lens are adhered together; or alternatively the polarizer is adhered onto one of the image source, the matching lens and the lens.

Optionally, the polarizer is a polarizing film.

Optionally, the image projection source also comprises a matching lens between the image source and the lens.

Optionally, the optical system also comprises an additional wave plate and an additional polarizer which are sequentially located distal to the semi-reflector, wherein the additional wave plate is configured in such a way that when circularly polarized light is incident on the additional wave plate, linearly-polarized light is able to come out of it, and the additional polarizer is configured to absorb the coming out linearly-polarized light, wherein the additional wave plate is preferably an additional quarter-wave plate. In this way, a possibility that the light emitted from the image source shoots out from the semi-reflector of the AR apparatus is eliminated or reduced, such that the privacy for the AR apparatus and the interactivity for users can be improved. In the meanwhile, effects of stray light and "ghost" caused by light transmitted through the reflector distally being partially reflected by a protective lens and finally entering the human eye can be eliminated or reduced.

Optionally, the additional wave plate and the additional polarizer are adhered together.

Optionally, the semi-reflector is a curved semi-reflector, wherein the additional wave plate and the additional polarizer are shaped in a lateral direction to substantially follow the semi-reflector's curved shape.

Optionally, the semi-reflector is a curved semi-reflector, wherein the additional wave plate and the additional polarizer are shaped in a longitudinal direction substantially perpendicular to the lateral direction to substantially follow the semi-reflector's curved shape.

Optionally, the semi-reflector is a curved semi-reflector, wherein the additional wave plate and the additional polarizer are shaped to substantially follow the semi-reflector's curved shape.

Optionally, the optical system also comprises a transparent protective sheet located distal to the additional polarizer, wherein the transparent protective sheet is preferably a light energy attenuation sheet, a photochromic sheet or an electrochromic sheet. In this case, the additional wave plate and the additional polarizer are designed to eliminate or weaken negative effects of "interference of ghost" and stray light caused by that light from the semi-reflector may be reflected by the transparent protective sheet to finally enter the human eye.

Optionally, the additional wave plate is configured in such a way that when circularly polarized light is incident on it, a polarized light component, whose polarization is in a first direction, can be transmitted therethrough, and the additional polarizer is configured in such a way that the polarized light component, whose polarization is in the first direction, can be absorbed.

Optionally, the additional wave plate is configured in such a way that when circularly polarized light is incident on it, a polarized light component, whose polarization is in a second direction, can be transmitted therethrough, and the additional polarizer is configured in such a way that the polarized light component, whose polarization is in the second direction, can be absorbed.

Optionally, the semi-reflector comprises a transparent substrate and a semi-reflective film being applied over a surface of the substrate.

Optionally, the additional wave plate and/or the additional polarizer is an additional retarder film and/or an additional polarizing film integrated on the semi-reflector, wherein the additional retarder film is preferably an additional quarter-retarder film. Therefore, the volume of the optical system is reduced so as to enable the AR apparatus to be more compact. Furthermore, the number of interferes where light reflection may occur can be reduced such that stray light in the whole optical system can be reduced or "ghost" effects can be weakened, and the contrast of the optical system can be enhanced.

Optionally, the surface of the substrate is a proximal surface thereof, and the additional retarder film is applied over a distal surface of the substrate, and/or the additional polarizing film is applied over a distal surface of the additional retarder film.

Optionally, the surface of the substrate is the distal surface thereof, and the additional retarder film is applied over the distal surface of the substrate, and/or the additional polarizing film is applied over the distal surface of the additional retarder film.

According to another optional embodiment of the present application, an optical system for an AR apparatus is provided, which optical system comprises:

an image projection source;
a polarizing beam splitter, wherein the polarizing beam splitter includes a beam splitting side adjacent to the image projection source and a transmission side facing away from the image projection source;
a first wave plate adjacent to the beam splitting side, wherein the polarizing beam splitter is arranged in such a way that light emitted from the image projection source is able to be non-perpendicularly incident on the beam splitting side and be at least partially reflected towards the first wave plate; and
a semi-reflector located downstream of the first wave plate in an optical path of the reflected light, wherein the polarizing beam splitter is configured in such a way that when the light emitted from the image projection source is incident on the beam splitting side, a polarized light component, whose polarization is in a first direction, passes through the polarizing beam splitter to be transmitted through the transmission side, and a polarized light component, whose polarization is in a second direction perpendicular to the first direction, is reflected by the beam splitting side towards the first wave plate, wherein the optical system also comprises:
a second wave plate and a polarizer which are sequentially located distal to the semi-reflector, wherein the second wave plate is arranged in such a way that when circularly polarized light is incident thereon, linearly-polarized light is able to be transmitted therefrom, and the polarizer is configured to absorb the transmitted linearly-polarized light, and wherein the first wave plate and/or the second wave plate is preferably a quarter-wave plate. In this way, a possibility that the light emitted from the image source may exit from the semi-reflector of the AR apparatus is eliminated or reduced, so that the privacy and interactivity for users can be improved. In the meanwhile, effects of stray light and "ghost" cause by light transmitted distally through the semi-reflector being partially reflected by a protective lens and finally entering the human eye can be eliminated or reduced.

Optionally, the second wave plate is adhered together with the polarizer.

Optionally, the semi-reflector is a curved semi-reflector, wherein the second wave plate and the polarizer are shaped in a lateral direction to substantially follow the semi-reflector's curved shape.

Optionally, the semi-reflector is a curved semi-reflector, wherein the second wave plate and the polarizer are shaped in a longitudinal direction substantially perpendicular to the lateral direction to substantially follow the semi-reflector's curved shape.

Optionally, the semi-reflector is a curved semi-reflector, wherein the additional wave plate and the additional polarizer are shaped to substantially follow the semi-reflector's curved shape.

Optionally, the optical system also comprises a transparent protective sheet located distal to the polarizer, wherein the transparent protective sheet is preferably a light energy attenuation sheet, a photochromic sheet or an electrochromic sheet.

Optionally, the first wave plate is a first retarder film being applied over the semi-reflector's proximal surface.

Optionally, the second wave plate is configured in such a way that when circularly polarized light is incident on it, light polarized in the first direction is able to be transmitted therethrough, and the polarizer is configured to absorb the light polarized in the first direction.

Optionally, the second wave plate is configured in such a way that when circularly polarized light is incident on it, light polarized in the second direction is able to be transmitted therethrough, and the polarizer is configured to absorb the light polarized in the second direction.

Optionally, the semi-reflector comprises a transparent substrate and a semi-reflective film being applied over a surface of the substrate.

Optionally, the second wave plate and/or the polarizer is a second retarder film and/or a polarizing film integrated on the semi-reflector. Such integration reduces the number of reflective interfaces, such that stray light of the whole optical system can be reduced or the effect of "ghost" can be eliminated to improve the contrast of the optical system.

Optionally, the surface of the substrate is a proximal surface thereof, wherein the second retarder film is applied over a distal surface of the substrate and/or the polarizing film is applied over a distal surface of the second retarder film.

Optionally, the surface of the substrate is a distal surface thereof, wherein the second retarder film is applied over the semi-reflective film's distal surface and/or the polarizing film is applied over a distal surface of the second retarder film.

In the context of the present application, various embodiments can be arbitrarily combined with each other. Although some concrete embodiments of the present application have been described here, they are given for explanatory purposes only and cannot be deemed to constrain the scope of the present application in any way. Without facing away from the spirit and scope of the present application, various replacements, modifications and alternations can be contemplated.

What is claimed is:

1. An optical system for an augmented reality apparatus, comprising:
   an image source;
   a beam splitter, the beam splitter having a beam splitting side adjacent to the image source and a transmission side facing away from the image source; and
   a semi-reflector, the semi-reflector being arranged adjacent to the beam splitting side and being downstream of the beam splitting side in an optical path along which light emitted from the image source is reflected by the beam splitting side, the beam splitter being arranged such that the light emitted from the image source is able to be at least partially reflected by the beam splitting side towards the semi-reflector,
   wherein the semi-reflector comprises a substrate and a semi-reflective film on a distal surface of the substrate,
   wherein the image source comprises a planar light emitter for emitting light, wherein the plane where the beam splitting side of the beam splitter locates is at a first angle ($\beta$) relative to the normal of the image source, which first angle has a value of between 11° and 79°; and/or wherein the plane where the beam splitting side of the beam splitter locates is at a second angle ($\alpha$) relative to an optical axis of the semi-reflector, wherein 0<the second angle ($\alpha$)<90° and the second angle is between the first angle ($\beta$)−10° and the first angle ($\beta$)+10°.

2. The optical system as recited in claim 1, wherein a wave plate is arranged between the beam splitter and the semi-reflector.

3. The optical system as recited in claim 1, wherein the substrate of the semi-reflector is a wave plate.

4. The optical system as recited in claim 1, wherein an anti-reflective film is applied over a proximal surface of the substrate.

5. The optical system as recited in claim 2, wherein the beam splitter is configured in such a way that when the light emitted from the image source is incident on the beam splitting side, a polarized light component, whose polarization is in a first direction, passes through the beam splitter to be transmitted through the transmission side, and a polarized light component, whose polarization is in a second direction perpendicular to the first direction, is reflected by the beam splitting side towards the wave plate, and wherein the beam splitter is further configured in such a way that when light is incident on the transmission side, a polarized light component, whose polarization is in the first direction, of the light is able to pass through the beam splitter to be transmitted from the beam splitting side, and a polarized light component, whose polarization is in the second direction, of the light is able to be absorbed in the beam splitter.

6. The optical system as recited in claim 5, wherein the beam splitter comprises a polarizing beam splitting film and a polarizing film, wherein the polarizing beam splitting film is configured to allow polarized light, whose polarization is in the first direction, to be transmitted and polarized light, whose polarization is in the second direction to be reflected, wherein the polarizing film is configured to allow polarized light, whose polarization is in the first direction, to be transmitted and polarized light, whose polarization is in the second direction, to be absorbed, and wherein viewed in a direction of the light emitted from the image source, the polarizing beam splitting film is located upstream of the polarizing film to define the beam splitting side.

7. The optical system as recited in claim 5, wherein an extraordinary axis and an ordinary axis of the wave plate are configured to include an angle with the first and second directions respectively, which angle is between 1° and 89°.

8. The optical system as recited in claim 1, wherein the semi-reflector is a curved semi-reflector.

9. The optical system as recited in claim 8, wherein the semi-reflector has a refractive power of between ±150 degrees.

10. A semi-reflector for an optical system as recited in claim 1, wherein the semi-reflector comprises a substrate and a semi-reflective film on a distal surface of the substrate.

11. The semi-reflector as recited in claim 10, wherein the substrate of the semi-reflector is a wave plate.

12. The semi-reflector as recited in claim 10, wherein an anti-reflective film is applied over a proximal surface of the substrate.

13. The semi-reflector as recited in claim 10, wherein the semi-reflector is a curved semi-reflector.

14. The semi-reflector as recited in claim 13, wherein the semi-reflector has a refractive power of between ±150 degrees.

15. The optical system as recited in claim 2, wherein an anti-reflective film is applied over a proximal surface of the substrate.

16. The optical system as recited in claim 3, wherein an anti-reflective film is applied over a proximal surface of the substrate.

17. The optical system as recited in claim 2, wherein the wave plate is a quarter-wave plate.

18. An augmented reality apparatus, comprising a bracket and an optical system as recited in claim 1, wherein the optical system is integrated in the bracket.

19. The augmented reality apparatus as recited in claim 18, wherein the bracket is an eyeglasses frame.

* * * * *